United States Patent Office 3,577,252
Patented May 4, 1971

3,577,252
PROCESS OF PRODUCING ZIRCONIUM SILICATE CERAMIC COLORING SUBSTANCES
Wilhelm Brugger, Essen, Germany, assignor to Th. Goldschmidt A.G., Essen, Germany
No Drawing. Filed Sept. 11, 1968, Ser. No. 759,223
Claims priority, application Germany, Sept. 13, 1967,
P 16 46 550.2
Int. Cl. C03c 5/02; C09c 1/00
U.S. Cl. 106—299                                8 Claims

ABSTRACT OF THE DISCLOSURE

Process of producing ceramic coloring substances suitable as glaze stains. Metal oxide containing, color producing mixtures are calcined or sintered in the presence of 1–5% by weight, calculated on the amount of the mixture to be sintered, of a halogenated hydrocarbon having a boiling or sublimation point above 50° C.

---

This invention generally relates to glaze stains and is particularly directed to an improvement in processes of producing ceramic coloring substances suitable for coloring or staining glaze.

Glaze stains or ceramic coloring substances are broadly speaking calcination or sintering products of oxide mixtures, as for example, of silicic acid or zirconium oxide and tin oxide which, additionally, contain a color-producing oxide, a so-called chromophor. Well known chromophors are, for example, V-vanadium pentoxide, chromic oxide and the like. In most instances, a desirable ceramic coloring substance requires also the presence of additives which frequently are referred to as mineralization agents. Such mineralization agents are, for example, the halides, carbonates and sulfates of the alkali metals. The presence of the mineralization agents facilitates the entry of the color producing oxide into the crystal lattice and generally enhances the desirable characteristics of the final stains. It has also been suggested to employ a portion of the oxide, necessary for the formation of the coloring substance, in the form of a salt. In respect to zirconium-containing glaze stains, it has thus been proposed to replace a minor portion of the zirconium oxide normally used, by corresponding amounts of zirconium fluoride, zirconium oxychloride or of a complex compound as, for example, ammonium zirconium fluoride. In respect to pink colored chrome-zirconium-titanium containing coloring substances, it has even been suggested to use solutions of zirconium oxychloride and titanium tetrachloride which are strongly acidified by hydrochloric acid. The handling of such solutions is, however, extremely cumbersome. Moreover, the addition of such halides renders the production of the coloring substances more expensive. It is also of particular disadvantage to treat the charge to be sintered or calcined with acidic aqueous solutions of the halides, since the mixtures obtained have to be dried prior to the sintering procedure. The drying, in turn, causes the formation of corrosive vapors which are injurious to health.

Accordingly, it is a primary object of the present invention to provide a process for the preparation of ceramic coloring substances which avoids and overcomes the disadvantages of the prior art procedures and which results in glaze stains or coloring substances of superior characteristics.

It is also an object of the present invention to provide a process of the indicated kind which is exceedingly simple to carry out with a minimum of equipment and at relatively low cost.

Briefly, and in accordance with this invention, the above objects are obtained by effecting the production of the glaze stains in the presence of an additive which is a halogenated hydrocarbon having a boiling or sublimation point above 50° C., the amount of the hydrocarbon, calculated on the charge or batch to be sintered, being about 1–5% by weight. By effecting the glaze stain production in the presence of such halogenated hydrocarbons, the use of the previously mentioned halides or their solutions is eliminated, while at the same time glaze stains of superior characteristics are obtained.

Halogenated hydrocarbons of the indicated kind and suitable for the purpose of this invention are, for example, carbon tetrachloride, tribromomethane (bromoform), perchloroethylene, hexachloroethane and hexachlorobenzene. Fluorinated hydrocarbons are also suitable. Further, halogenated hydrocarbons containing different halogen atoms are also encompassed by the present invention.

By employing liquid hydrocarbons in the specified small quantities, complete absorption of the hydrocarbons by the oxide mixture to be sintered takes place and the mixture remains in powder form.

The color intensity and the color value of the coloring substances are significantly increased by the inventive procedure. An additional advantage of the inventive process resides in the fact that the sintered coloring substance can be readily removed from the sintering crucible and does not exhibit any tendency to adhere to the walls of the crucible. The coloring substances obtained in accordance with the invention have a loose structure and can be ground in simple manner to any desired fineness degree.

The invention will now be described by several examples, it being understood that these examples are given by way of illustration and not by way of limitation and that many changes may be effected, particularly in the choice of starting materials, without affecting in any way the scope and spirit of the invention as recited in the appended claims.

EXAMPLE I

Zirconium-vanadium blue

A mixture consisting of:

65.0 g. of finely ground, technically pure monoclinic zirconium oxide having a content of 99% Zr, $HFO_2$;
32.5 g. of quartz powder;
4.0 g. of ammonium metavanadate;
3.0 g. of sodium fluoride; and
3.0 g. of carbon tetrachloride was calcined at 860° C. for two hours in a covered crucible. A coloring substance of deep blue color and consisting of zirconium vanadium blue was obtained. The product has a loose structure and was readily ground in a ball mill to a powder of extreme fineness. The product was washed with water in ordinary manner for the removal of alkali metal salts and any alkali metal vanadate which might have been contained in the coloring substance.

EXAMPLE II

Zirconium-vanadium green

A mixture of:

66.0 g. of finely ground, technically pure monoclinic zirconium oxide having a content of 99% Zr, $HFO_2$;
22.0 g. of quartz powder;
4.5 g. of ammonium metavanadate; and
4.5 g. of bromoform was sintered in a covered crucible at 1,250° C. for two hours. A strongly green colored zirconium-vanadium coloring substance of porous structure was obtained. The coloring substance could be readily removed from the crucible and ground to a powder of great fineness.

EXAMPLE III

Zirconium-praseodymium-yellow

A mixture consisting of:

- 105.0 g. of finely ground, technically pure monoclinic zirconium oxide having a content of 99% Zr, $HFO_2$;
- 55.0 g. of quartz powder;
- 4.3 g. of technically pure praseodymium oxide having a content of 90% $Pr_6O_{11}$;
- 8.0 g. of sodium fluoride;
- 3.0 g. of sodium chloride;
- 2.0 g. of sodium carbonate;
- 2.0 g. of Teflon powder was calcined at 920° C. for 2½ hours in a covered crucible. A strongly yellow colored, porous sintered mass consisting of zirconium praseodymium yellow was obtained. The product was readily ground in a ball mill to a powder of extreme fineness. After the removal of alkali metal salts by washing with water the product was dried in ordinary manner.

EXAMPLE IV

Zirconium-chromium-green

A mixture consisting of:

- 35.0 g. of finely ground, technically pure monoclinic zirconium oxide having a content of 99% Zr, $HFO_2$;
- 12.5 g. of quartz powder;
- 5.0 g. of diatomaceous silica powder;
- 5.0 g. of chromium-III-oxide $Cr_2O_3$;
- 3.0 g. of sodium fluoride;
- 1.0 g. of sodium chloride;
- 2.0 g. of bromoform $CHBr_3$ was calcined at 950° C. for two hours in a covered crucible. A colored porous mass of deep green color and consisting of zirconium chromium green was formed during the calcination procedure. The product has a loose structure and was readily ground in a ball mill. The alkali metal salts of the finely ground product were removed by washing with water in ordinary manner.

EXAMPLE V

Iron-zirconium-pink

A mixture consisting of:

- 66.0 g. of finely ground, technically pure monoclinic zirconium oxide having a content of 99% Zr, $HFO_2$;
- 35.0 g. of quartz powder;
- 33.0 g. of ferrous sulphate $FeSO_4 \cdot 7H_2O$;
- 7.0 g. of ferrous sulphate $FeSO_4 \cdot 7H_2O$ dissolved in 6 cm.³ water;
- 14.0 g. of sodium fluoride;
- 7.0 g. of sodium chloride;
- 5.0 g. of ammonium nitrate;
- 5.0 g. of bromoform $CHBr_3$ was calcined at 860° C. for 3½ hours in a covered crucible. A strongly pink colored mass having a loose structure was formed during the calcination procedure. The alkali metal salts were removed by washing with water in ordinary manner, after having finely ground the calcined mass in a ball mill.

What is claimed is:

1. In a process of producing ceramic coloring substances wherein a zirconium comprising, color producing mixture is sintered, the improvement which comprises that the mixture, prior to sintering, is admixed with about 1–5% by weight, calculated on the amount of the mixture, of a halogenated hydrocarbon having a boiling or sublimation point of above 50° C., said halogenated hydrocarbon being at least one of carbon tetrachloride, bromoform, perchloroethylene, hexachloroethane, hexachlorobenzene and perfluoroethylene, said sintering being carried out at a temperature of between about 860–1250° C.

2. The improvement of claim 1, wherein the mixture contains a mineralization agent.

3. The improvement as claimed in claim 1, wherein said mixture consists essentially of zirconium oxide, quartz powder and ammonium metavanadate.

4. The improvement as claimed in claim 3, wherein said hydrocarbon is carbon tetrachloride.

5. The improvement as claimed in claim 3, wherein said hydrocarbon is bromoform.

6. The improvement of claim 3, wherein said mixture also contains sodium fluoride.

7. In a process of producing a zirconium and vanadium containing glaze stain, wherein a mixture consisting essentially of zirconium oxide, quartz powder and a vanadium containing salt is sintered, the improvement which comprises that the mixture, prior to sintering, is admixed with about 1–5% by weight, calculated on the amount of mixture to be sintered, of a halogenated hydrocarbon having a boiling or sublimation point of about 50° C., said halogenated hydrocarbon being at least one of carbon tetrachloride, bromoform, perchloroethylene, hexachloroethane, hexachlorobenzene and perfluoroethylene, said sintering being carried out at a temperature of between about 860–1250° C.

8. The improvement of claim 7, wherein the vanadium containing salt is ammonium metavanadate.

References Cited

UNITED STATES PATENTS

| | | | |
|---|---|---|---|
| 3,166,430 | 1/1965 | Seabright | 106—48X |
| 3,168,410 | 2/1965 | Bruneau | 106—299 |
| 3,171,753 | 3/1965 | Olby | 106—48X |
| 3,189,475 | 6/1965 | Marquis et al. | 106—48X |
| 3,330,678 | 7/1967 | Meyer-Simon et al. | 106—48X |

FOREIGN PATENTS

| | | | |
|---|---|---|---|
| 879,962 | 10/1961 | Great Britain | 106—48 |
| 926,774 | 5/1963 | Great Britain | 106—48 |

HELEN M. McCARTHY, Primary Examiner

W. R. SATTERFIELD, Assistant Examiner

U.S. Cl. X.R.

106—34, 48